United States Patent Office 3,564,411
Patented Feb. 16, 1971

3,564,411
PULSE DETECTION BY MEANS OF PATTERN RECOGNITION
Harold Seidel, Warren Township, Somerset County, N.J., assignor to Bell Telephone Laboratories, Incorporated, Murray Hill, N.J., a corporation of New York
Filed Mar. 18, 1969, Ser. No. 808,134
Int. Cl. H03k 11/00; H04b 7/18
U.S. Cl. 325—13
6 Claims

ABSTRACT OF THE DISCLOSURE

This application describes a system of pulse detection and regeneration which involves the steps of (1) comparing the received signal with a plurality of locally-generated, predistorted signals representing all possible pulse trains; (2) isolating the one comparison signal which is indicative of the "correct" locally-generated pulse train; (3) identifying the reference generator that produced the "correct" pulse train; and (4) transmitting an undistorted replica of the distorted received signal in response to said identification.

---

This invention relates to pulse code modulation transmission systems and, more particularly, to pulse detectors for use in such systems.

BACKGROUND OF THE INVENTION

An advantageous feature of a pulse code modulation (PCM) transmission system is the ability to reconstruct the transmitted pulse train after it has traveled through a dispersive medium. This process of reconstruction, or pulse regeneration, involves a decision making process in which the pulse regenerator must determine the amplitude of the signal in each time slot. One of the difficulties inherent in this decision making process, however, resides in the fact that when pulses are transmitted through a transmission medium, the effect of dispersion is to distort the pulses and, in particular, to set up precursor and successor transients which effect the amplitudes and, hence the detectability of neighboring pulses. Thus, the detection level cannot be preset since the amplitude of any pulse will vary with the information content of the signal. On the other hand, the extent of pulse overlap, for any given medium, is a completely deterministic event and, hence, can be taken into account by the detector.

SUMMARY OF THE INVENTION

In accordance with the present invention, the distorted pulses to be regenerated are examined in the time coincidence with locally-generated pulse patterns that have been predistorted in a manner to duplicate the known pattern distortion produced by the transmission system. The examination is made on a pulse-by-pulse basis, and the correct signal for the time slot being examined is indicated whenever there is pattern coincidence. Means are provided for identifying the correct pulse pattern and for regenerating this pulse pattern in response thereto.

A regenerator in accordance with the invention can be employed wherever the nature of the pulse distortion can be defined. As such it can be utilized to detect and regenerate pulses distorted by the dispersion of a transmission line or a delay line.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
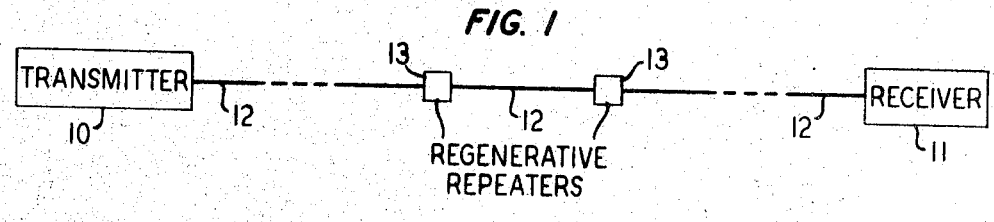
FIG. 1 shows, in block diagram, components of a typical prior art pulse code modulation communication system.

Referring to the drawings, FIG. 1 shows, in block diagram, the components of a typical pulse code modulation communication system comprising a transmitter 10 connected to a receiver 11 by means of a transmission medium 12. As indicated hereinabove, it is an advantage of a pulse-encoded signal that it can be regenerated after it has traveled through a dispersive medium. Accordingly, a plurality of regenerative repeaters 13 are distributed along medium 12 at regularly spaced intervals.

Figure 2:
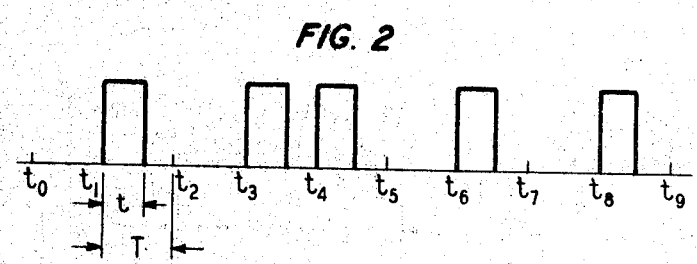
FIG. 2 included for purposes of explanation, shows an arbitrary undistorted pulse train.

FIG. 2, included for purposes of explanation, shows an arbitrary pulse train as it might appear at the output of transmitter 10. The pulses, it will be noted, are video pulses. In a system in which high-frequency alternating current pulses are transmitted, the pulse train of FIG. 2 would represent the video signal used to modulate the high frequency carrier signal. In the discussion that follows, however, reference will only be made to the video signal.

It will also be noted that the pulse train is depicted as comprising a series of marks (pulses of finite amplitude greater than zero) and spaces (pulses of zero amplitude), each of which occupies a separate time slot of duration $T$. Each of the marks has a pulse width $t$ less than $T$. As will become apparent, the pulse detector and regenerator to be described can also be employed in a polar binary system comprising plus and minus marks, or in a three level system comprising plus and minus marks and spaces.

Figure 3:
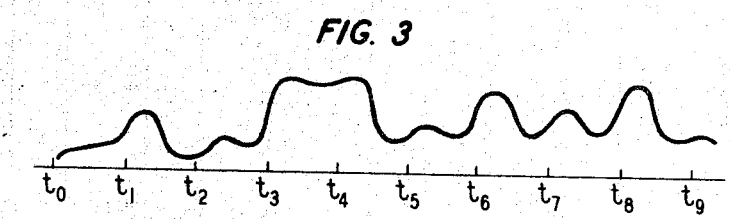
FIG. 3 shows the pulse train of FIG. 2 after it has been distorted by dispersion in a transmission line.

FIG. 3 shows the pulse train of FIG. 2 after it has been distorted by dispersion in transmission medium 12. Due to the dispersion in the medium, precursor and successor transients have been generated causing a general smearing and overlapping of the video signal. For purposes of explanation, it will be assumed that the system bandwidth and dispersion is such that the overlapping is limited to adjacent time slots.

As indicated hereinabove, in order to regenerate the pulse train of FIG. 3, it is necessary that the pulse detector at each regenerative repeater 13 examine the signal in each time slot and determine whether it is a space or mark. As is evident from FIG. 3, this can no longer be done with complete accuracy in view of the distortion produced by the transmission medium. On the other hand, it must be recognized that though distorted, the received signal still contains the original information, modified by the transmission medium. Since this modification is a completely deterministic event, the resulting pulse patterns for all possible pulse configurations can be ascertained in advance, and these can then be used as references with which the received signal can be compared. Pattern coincidence will automatically indicate which one of these is the proper pulse sequence, thus permitting correct regeneration of the received signal. Accordingly, pulse regeneration, in accordance with the present invention, involves the steps of (1) comparing the received signal with a plurality of locally-generated, predistorted signals representing all possible pulse trains; (2) isolating the one comparison signal which is indicative of the "correct" locally-generated pulse train; (3) identifying the reference generator that produced the "correct" pulse train; and (4) transmitting an undistorted replica of the distorted received signal in response to said identification.

Figure 4:
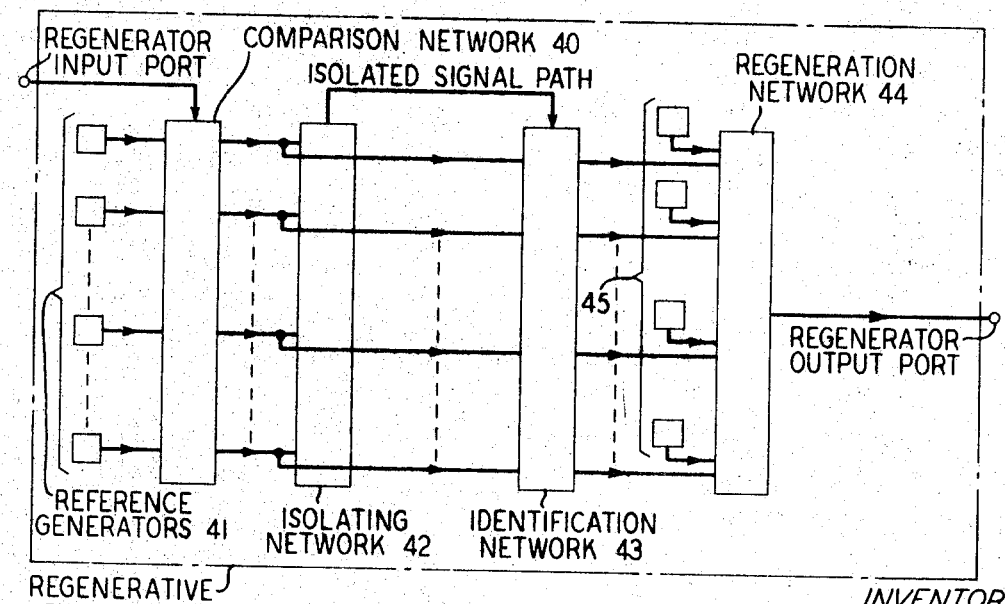
FIG. 4 shows, in block diagram, a regenerative repeater in accordance with the present invention.

FIG. 4 shows, in block diagram, a regenerative repeater 13 including apparatus for performing the above-enumerated steps. As illustrated, the regenerative repeater comprises a comparison network 40 which compares the distorted input signal with a plurality of different, locally-generated, predistorted pulse trains produced by reference generators 41. This comparison is made on a pulse-by-pulse basis. As a result of this comparison, an equal plurality of comparison signals are produced which are indicative of the degree of similarity between the input signal and the locally-generated pulse trains. More specifically, one of the comparison signals is the "correct" one. That is, it is indicative of the locally-generated pulse train that most closely resembles the input signal.

It is the function of the isolation network 42 to identify and isolate the correct comparison signal, and for the identification circuit 43 to compare this isolated signal with each of the comparison signals and thereby determine which of the reference generators 41 generated the correct pulse train.

The identification network, after making this comparison, generates a gating signal which is coupled to the regeneration network 44 along with the signals from a second plurality of signal generators 45. The latter generates the same pulse trains as do the reference generators 41. Unlike the latter, however, the signals produced by generators 45 are not distorted. The function of the gating signal produced by identification circuit 43 is to gate the generator whose output is the same as that of the correct reference generator, thereby producing the correct, regenerated output pulse for the time slot being examined.

Figure 5:
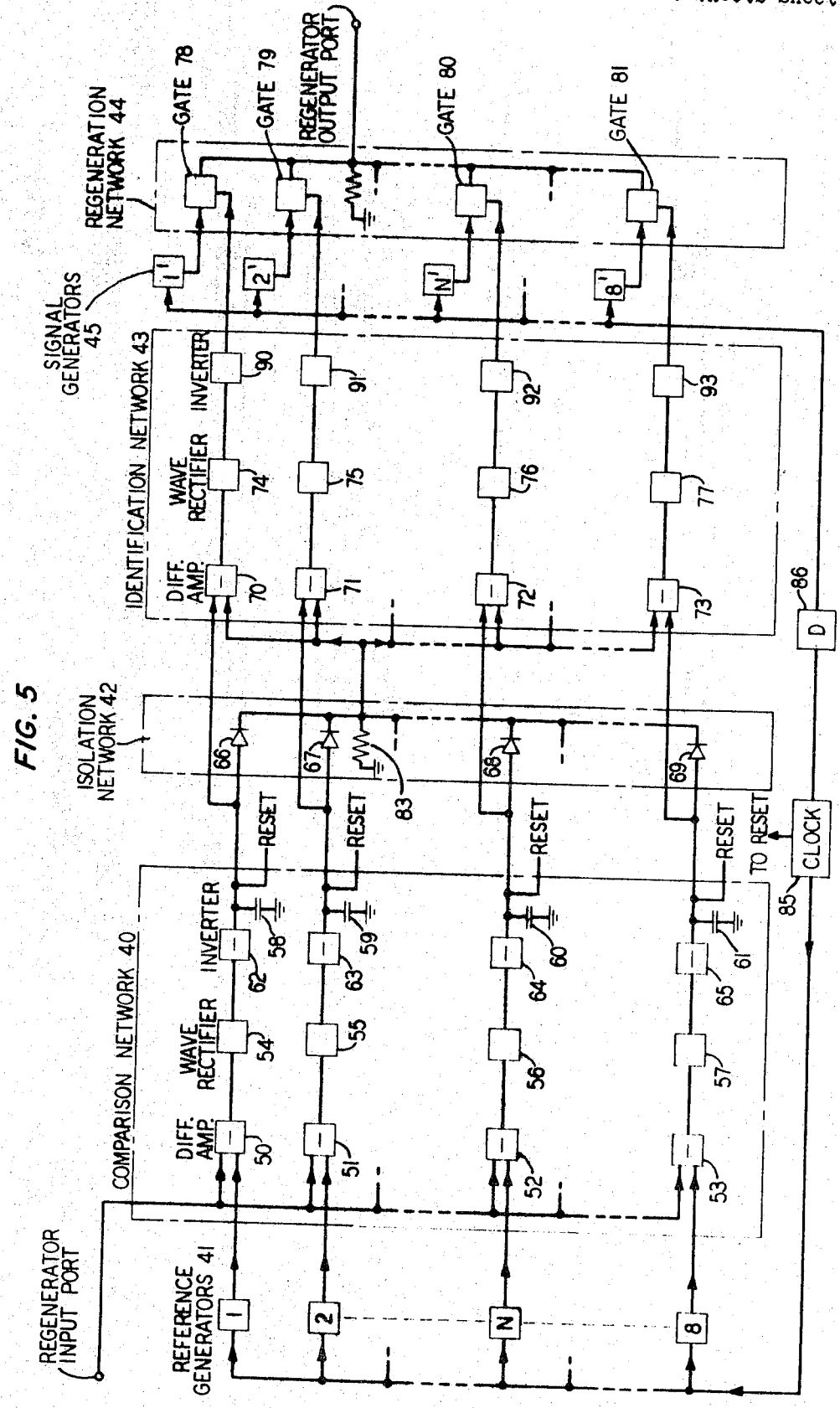
FIG. 5 shows in greater detail the circuits identified in FIG. 4.

Having broadly outlined the operation of a regenerative repeater, in accordance with the present invention, the various circuits and the mode of operation will now be considered in great detail in connection with FIG. 5.

Since it has been assumed that the signal in any time slot is influenced only by the signals in the two immediately adjacent time slots, there are a total of eight possible pulse train combinations that must be taken into account. These are given in Table I as Table I
000
001
010
011
100
101
110
111

Accordingly, the regenerative repeater circuit shown in FIG. 5 includes eight, 3-bit signal reference generators 1 through 8 that continuously generate the eight, 3-bit words shown in Table I. (This is merely for purpose of illustration. It will be recognized that no generator will be required to generate a 000 pulse train.) The anticipated distortion can be obtained by passing each of the eight locally-generated pulse trains through a network having the same dispersion characteristic as the transmission medium through which the input signal propagates. This produces eight predistorted reference pulse patterns with which the input signal is to be compared.

A convenient alternative way of obtaining the distorted reference pulse patterns is to use the actual transmission medium and record the pulse patterns received at the repeater when the input end of the system is energized, in turn, by each of these eight words. These recordings are then played back continuously as the reference signals. This has the advantage of simplicity, flexibility and accuracy. In addition, the test transmissions can be conveniently repeated at regular intervals, and new recordings made, thus insuring that changes in the dispersion characteristic of the system are taken into account.

Table II shows the pulse trains produced by the reference generators.

TABLE II

| Reference generator: | → | $T_1$ | → | Pulse trains | | | | | | |
|---|---|---|---|---|---|---|---|---|---|---|
| 1 | 0 | 0 | 0 | 0 | 0 | 0 | 0 | 0 | 0 | 0 | 0 |
| 2 | 0 | 0 | 1 | 0 | 0 | 1 | 0 | 0 | 1 | 0 | 0 | 1 |
| 3 | 0 | 1 | 0 | 0 | 1 | 0 | 0 | 1 | 0 | 0 | 1 | 0 |
| 4 | 0 | 1 | 1 | 0 | 1 | 1 | 0 | 1 | 1 | 0 | 1 | 1 |
| 5 | 1 | 0 | 0 | 1 | 0 | 0 | 1 | 0 | 0 | 1 | 0 | 0 |
| 6 | 1 | 0 | 1 | 1 | 0 | 1 | 1 | 0 | 1 | 1 | 0 | 1 |
| 7 | 1 | 1 | 0 | 1 | 1 | 0 | 1 | 1 | 0 | 1 | 1 | 0 |
| 8 | 1 | 1 | 1 | 1 | 1 | 1 | 1 | 1 | 1 | 1 | 1 | 1 |

For example, generator 1 generates a series of spaces while generator 8 generates a series of marks. Each of the other generators generates a different series of marks and spaces. In each instance, the signal in any time slot is predistorted in a manner determined by the presence of a mark or space in the next adjacent time slot, and by the dispersion characteristic of the transmission medium.

In operation, the received signal is compared with each of the reference generator signals. This comparison is made in differential amplifiers 50–53 of comparison network 40. For example, the signal received during time interval $T_1$ is compared with each of the reference signals generated during the same time interval. These are shown in Table II in the column under $T_1$. Thus, the input signal is compared, for example, with a space, preceded and followed by a space, as generated by reference generator 1. It is also simultaneously compared with a mark, preceded and followed by a mark, as generated by reference generator 8. Similarly, the signal at time $T_1$ is compared with the signal patterns generated by each and every one of the other six reference generators.

Each of the differential amplifiers 50–53 produces an output signal which results from the above-described comparison. Ideally, the received pulse pattern will be identical with the pulse pattern generated by the "correct" reference generator, and a zero difference signal will be produced by the corresponding differential amplifier. More generally, however, the amplitude of this difference signal will be greater than zero but less than the difference signals produced by the other, "incorrect" reference generators. Since these difference signals can be either positive or negative, they are then coupled to full-wave rectifiers 54–57 and all converted to the same polarity, either positive or negative.

As indicated hereinabove, the difference signal produced by the correct reference generator is very small. Since it is inconvenient to work with such small signals, the differences signals are advantageously inverted by means of a group of inverter circuits 62–65 such that the smallest difference signal becomes the largest signal and, conversely, the largest difference signal becomes the smallest signal.

The outputs from the inverters are then integrated over the period T of a full time slot by capacitors 58–61. At the end of each period T, the capacitors are discharged by means of reset circuits which momentarily short-circuit the capacitors in preparation for the signals in the next time slot.

The integrated inverted signals are all coupled to isolation network 42 which identifies and isolates the largest of these signals. The circuit comprises a plurality of similarly-poled diodes 66–69, each of which is connected, at one end, to one of the inverter circuits 62–65 and at the other end to a common load impedance 83. In this configuration, the largest signal applied to one of the diodes develops a voltage across load 83 which, in turn, back-biases the other diodes, thereby cutting them off. Thus, this circuit isolates the largest inverted signal from all the other inverted signals. Since the former is derived from a comparison of the input signal and the correct reference generator, the isolation network identifies the correct pulse pattern. It now remains to determine which of the reference generators produced this pulse pattern.

In the illustrative embodiment of FIG. 5, identification of the isolated signal is made by comparing the isolated signal with each of the inverted signals derived from comparison circuit 40. This is done in identification network 43 which, in the embodiment of FIG. 5, is similar to comparison network 40, comprising differential amplifiers 70–73, coupled to full-wave rectifiers 74–77 and inverters 90–93.

The output from identification network 43 identifies the correct reference generator and, thereby, identifies the correct pulse pattern for the particular time slot being considered. Having made this identification, it now remains to generate and retransmit a regenerated replica of the received pulse. That is, the regenerator, having made its decision, must now transmit an undistorted mark or space. This is done by providing a second set of pulse generators 1' to 8' which, like reference generators 1–8 are continuously generating 3-bit pulse trains These are identical to the corresponding pulse trains simultaneously being generated by the reference generators, except that they are not distorted and are somewhat delayed in time, as will be explained hereinbelow. Accordingly, one of these generators is generating the proper pulse and all that remains to be done is to gate the output from this particular one generator. This is done by coupling each of the generators to one of the gating circuits 78–81 along with the outputs from identification network 43. The gating circuits are designed to pass the signal of the associated generator when gated on by one of the identification network circuits. Since only one of these circuits will produce an output gating signal of sufficient amplitude, the signal from only one of the generators 1'–8' is passed.

The output branches of gating circuits 78–81 are combined on a common regenerator output port.

As is apparent from the above description, generators 1–8 and 1'–8', and the reset circuits must be synchronized with the signal. This is done in the usual manner by providing synchronizing signals derived from a clock circuit 85. The latter regulates the reference generators 1–8 so that they are in time synchronization with the input signal, and synchronizes the reset circuits so that they discharge the integrating capacitors at the end of each time slot.

The synchronizing signal to generators 1'–8' is delayed relative to the synchronizing signal to generators 1–8 by means of a delay network 86. This is necessary since it is only after integrating the rectified outputs from differential amplifiers 50–53 over the period equal to one time slot that the difference signals are obtained. Hence, the identification network 43 responds towards the end of the time slot being examined. Accordingly, the time delay introduced by delay network 86 is of the order of one time slot or more, depending upon the nature of the identification network.

Figure 6:
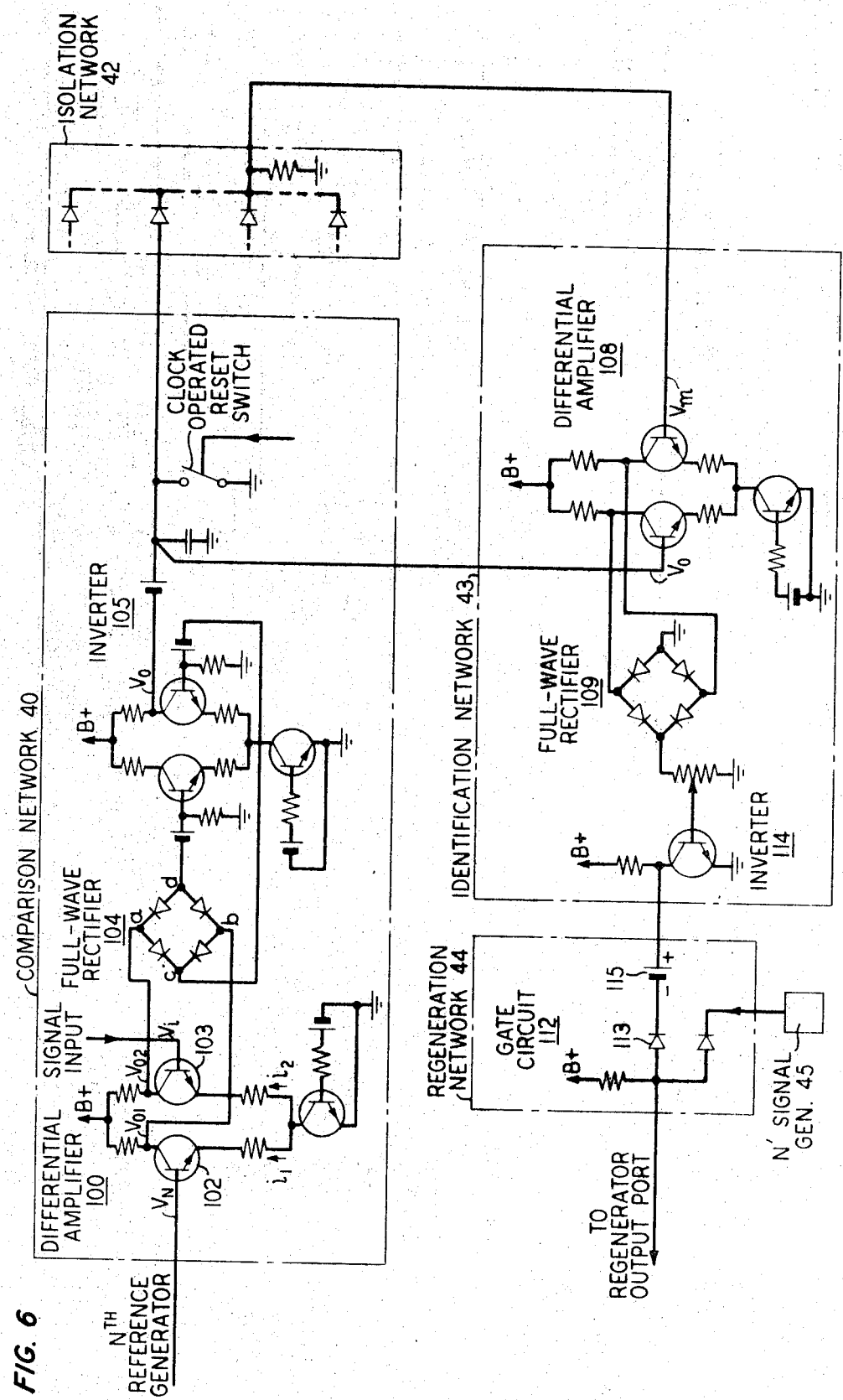
FIG. 6, included for purposes of illustration, shows one of the many possible specific embodiments of the circuit functions referred to in FIG. 5.

FIG. 6, included for purposes of illustration, shows one of the many possible specific embodiments of the circuit functions referred to hereinabove. In particular, the Nth channel associated with the Nth reference generator is illustrated. It is understood, however, that there would be seven other channels, for a total of eight.

As illustrated, each of the channels in comparison network 40 includes a differential amplifier 100, comprising a forward-biased transistor 101 connected to provide current to a pair of transistors 102 and 103. The latter are connected in parallel in the collector circuit of transistor 101, which functions essentially as a constant current source whose collector current divides between transistors 102 and 103.

When the reference generator signal $V_N$ and the input signal $V_i$ are the same, the collector current of transistor 101 divides equally between transistors 102 and 103, (i.e., $i_1 = i_2$), and the two output voltages $V_{o1}$ and $V_{o2}$ produced at the collector terminals of transistors 102 and 103 are also equal. Thus, with identical input signals, the differential amplifier output signal is zero. If, however, the two input signals are not the same, the current distribution changes, (i.e., $i_1 \neq i_2$) producing output voltages $V_{o1}$ and $V_{o2}$ that are no longer equal.

The two output signals $V_{o1}$ and $V_{o2}$ are coupled to one pair of opposite nodes $a$–$b$ of a standard bridge rectifier 104. The other pair of nodes $c$–$d$ are, in turn, coupled to an inverter circuit 105, which is a second differential amplifier, essentially identical to differential amplifier 100.

As can be seen, if the differential output signal from amplifier 100 is zero, indicating the correct pulse pattern, the rectified voltage applied across inverter 105 is also zero and the output voltage $V_o$ derived at the collector of transistor 106 is a maximum. For all other differential output signals, the rectifier is poled such that the rectified signal applied to the inverter 105 reduces the output signal $V_o$. Thus, the correct pulse pattern results in the maximum output signal from inverter 105.

The inverted signal is integrated over the period of one time slot by capacitor 107, and the maximum inverted signal is isolated by isolation network 42, whose operation was explained hereinabove.

The signal $V_m$ thus isolated is compared with each of the inverted signals, such as signal $V_o$ of the Nth channel illustrated in FIG. 6. This is done in a differential amplifier 108 of identification network 43. The differential output from amplifier is coupled to a full-wave rectifier 109 whose output is, in turn, inverted in an inverter circuit 114.

The output from identification network 43 is a maximum when signals $V_o$ and $V_m$ are the same. That is, the channel associated with the correct pulse pattern will produce the maximum signal in its identification network circuit. The signals produced in the other channels will be correspondingly smaller, depending upon how different the pulse patterns produced by the references generator associated with the other channels are from the input signal. It will be recognized, however, that this difference will not be very large for some of the channels. For example, the signal produced in the Nth channel identification network circuit by a 111 pulse train may not differ much from the signal produced in the $(N+i)$th channel by a 110 pulse train. It will be noted, however, that in both pulse trains the middle pulse, which is the one under examination, is a mark. Thus, in either instance, the correct pulse would be regenerated. Accordingly, it is not necessary for the gate circuits in the regeneration network 44 to identify only the maximum signal. All that is required is that it identifies signals above some preselected level. Thus, a reference level is defined by a D.C. source 115 included in the wavepath between inverter 114 and the gate circuit 112. Whenever the output from inverter 114 is below this preselected reference level, indicating a large difference between the isolated signal $V_m$ and signal $V_o$, diode 113 of gate 112 is made conductive and the signal from the N' generator is shorted out. Whenever the difference between signals $V_o$ and $V_m$ is small, diode 113 remains nonconducting, and the signal from the N' generator is passed.

While only one channel, the Nth, is shown, it is understood, however, that the repeater will include a total of eight identical channels, one for each of the eight pulse trains illustrated in Table I. It will also be recognized by those skilled in the art that suitable amplifiers, not illustrated in FIG. 6, would be included wherever gain is required, and that direct current sources would also be included in the various circuits to maintain the proper voltage levels throughout the repeater. Finally, it will be understood that the specific circuits shown in FIG. 6 are merely illustrative, and that other circuits well known in the art, can just as readily be employed as alternatives. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. A method of detecting and regenerating a pulse-encoded signal comprising the steps of (1) comparing the received signal with a plurality of locally-generated predistorted signals representing all possible pulse trains of significance; (2) isolating the one comparison signal which is indicative of the "correct" locally-generated pulse train; (3) identifying the reference generator that produced the "correct" pulse train; and (4) transmitting an undistorted replica of the distorted received signal in response to said identification.

2. In a pulse transmission system;
a pulse transmitter;
a regenerative repeater;
and a dispersive wavepath having a known delay characteristic connecting said transmitter to said repeater;
said repeater comprising:
   a plurality of local signal sources for generating a plurality of known pulse patterns having a delay distortion equal to that produced by said wavepath;
   means for comparing the pulse patterns produced by pulses transmitted through said wavepath with the pulse patterns produced by each of said local signal sources;
   means for identifying which one of said locally-generated patterns is the same as said transmitted pulses;
   and means for regenerating said transmitted pulses in response to said identification.

3. The system according to claim 2 wherein said means for comparing comprises a differential amplifier.

4. The system according to claim 3 including a plurality of wave rectifiers wherein each of the difference signals produced by comparing the pulse pattern produced by pulses transmitted through said wavepath with the pulse patterns produced by said local signal sources is coupled to one of said wave rectifiers;
   wherein the outputs from said rectifiers are inverted such that the smallest of said outputs becomes the largest, and the largest of said outputs becomes the smallest;
   and wherein said inverted signals are integrated over a period equal to the time between pulses.

5. The system according to claim 4 wherein said means for identifying includes:
   a plurality of similarly-poled diodes, each of which has one electrode coupled to one of said integrating circuits and the other ends of which are coupled to a common load;
   and means for comparing the signal produced across said common load with each of said integrated inverted signals.

6. The system according to claim 5 including a second plurality of local signal sources for generating a plurality of undistorted pulse patterns;
   each of said second plurality of signal sources being coupled to separate gating circuits;
   and wherein the output from said identifying means gates at least one of said gating circuits.

References Cited

UNITED STATES PATENTS

| | | | |
|---|---|---|---|
| 3,383,465 | 5/1968 | Wilson | 178—70 |
| 3,384,873 | 5/1968 | Sharma | 340—146.1 |
| 3,437,760 | 4/1969 | Kawashima et al. | 179—15 |
| 3,440,337 | 4/1969 | Creasy et al. | 328—164X |

RICHARD MURRAY, Primary Examiner

B. V. SAFOUREK, Assistant Examiner

U.S. Cl. X.R.

178—70; 325—42; 328—164